May 27, 1952     U. A. ALFREDEÉN     2,597,849
THREAD-CUTTING DEVICE
Filed April 13, 1949
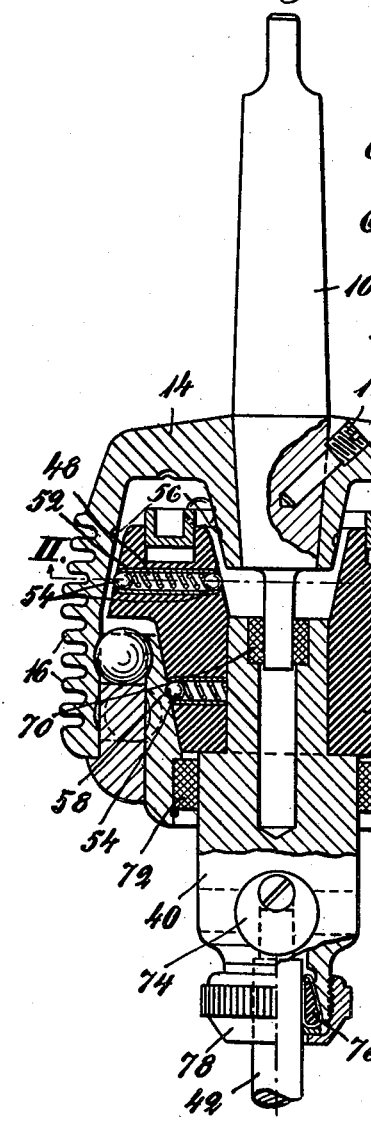
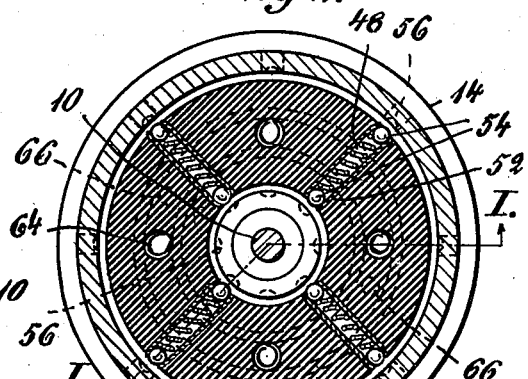
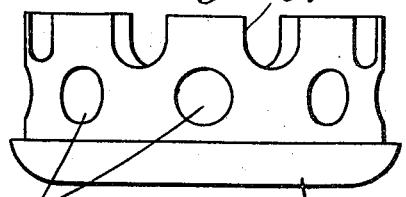

Patented May 27, 1952

2,597,849

UNITED STATES PATENT OFFICE 2,597,849

THREAD-CUTTING DEVICE

Uno Allan Alfredeén, Stockholm, Sweden, assignor to Aktiebolaget Svenska Precisionsverktyg, Nacka, Sweden, a corporation of Sweden Application April 13, 1949, Serial No. 87,216
In Sweden April 17, 1948

5 Claims. (Cl. 74—205)

My invention relates to a thread cutting device of the reversible type which includes a driving member and a driven member with interposed torque-transmitting rolling bodies such as balls.

Thread cutting devices of this kind are intended, with a constant direction of rotation of the driving member, to allow of a reversible rotational movement of the driven member and the tool mounted on the latter, such as a screw-tap. In prior constructions, however, the transmission of torque between the driving and driven members has been effected by various combinations of toothed wheels, such as epicyclic gears or the like, and such constructions result in a device of relatively large dimensions, in particular so as to reduce their sensitivity to high speed.

Materials, presently used, of which the cutting tools are made render it possible to carry out the thread cutting operation at very high rotational speeds and one object of this invention is to provide a thread cutting device of the above kind which even with the transmission of large torques provides a compact construction and enables the tool to be rotated at high speeds with low axial pressures. A further object of the invention is to provide a device which while having the above characteristics is simple and cheap to manufacture.

Further objects and advantages of the invention will be apparent from the following description considered in connection with the accompanying drawing, which forms a part of the specification and of which:

Fig. 1 is a longitudinal sectional view taken on the line I—I of Fig. 2 of a thread cutting apparatus constructed according to the invention;

Fig. 2 is a transverse section taken on the line II—II of Fig. 1;

Fig. 3 is a side elevation of a ball retainer forming part of the apparatus;

Fig. 4 is a top view of a portion of the ball retainer illustrated in Fig. 3; and Fig. 5 is a view on an enlarged scale of a detail shown in the same section as in Fig. 1.

Referring to the drawing, 10 designates a spindle centrally secured by means of a screw 12 in a downwardly open hood 14 forming a hollow body of rotation and provided with external cooling flanges 16. Within the hood and adjacent the open end thereof, the inner hood wall is formed with two roller races 18 and 20 disposed in spaced relation. In the embodiment illustrated, rolling bodies in the form of balls 22 are adapted to roll in said roller races 18 and 20. The balls are held in position by and mounted in a ball retainer 24, and they run in two further roller races 26 and 28 formed in an annular element 30 located inside said retainer. For the sake of clarity, eight balls only have been represented in each row, but in practice their number would be considerably larger, so that the balls would be located nearer to one another. When the balls are to be introduced into the roller races, the element 30, prior to fixing the retainer in its predetermined position, is moved to one side of the interior of the hood 14 and the balls are inserted into the upper roller races 18 and 26. Thereafter the element 30 is centered in the hood, the balls then being distributed so that, upon introducing the retainer between the element 30 and the hood 14, the upper ring of ball recesses 32 of the retainer, which recesses extend through the upper rim of said retainer, conforms to the distribution of the balls and each recess receives a ball in its downwardly curved portion. As will be seen from Fig. 4, the side walls 33 of the ball recesses also conform to the peripheral portions of the balls, inasmuch as the recesses have been formed by drilling inwardly from the rim of the retainer parallel to the axis of rotation thereof. Balls are also inserted into the lower ring of ball recesses 34 of the retainer through an aperture (not shown) in the wall of the hood, the aperture subsequently being sealed by means of a stopper. When the balls have thus been located, the hood, the retainer, and the annular element 30 are held in a mutually fixed position in the axial direction by means of the balls engaging the roller races.

Above the annular element 30, the inner wall of which tapers downwardly, the inner surface of the hood 14 is formed with an annular groove 36 tapering conically in an upward direction. This annular groove, as well as the inner wall of the element 30, is intended to co-operate with a member 38 axially displaceable within the hood 14 and secured to a spindle 40 adapted to support the tool, in the present case a screw-tap 42. The member 38, consisting of a reinforced synthetic mass or other suitable friction material, is provided at its upper end with an annular portion 44 shaped correspondingly to the annular groove 36 and adapted in one position of the spindle 40 to enter said groove in frictional engagement with the walls thereof and in another position of said spindle to move out of said groove, a conical portion 46 formed at the lower end of the member then frictionally engaging the interior of the annular element 30.

To increase the frictional effect, the conical portions 44 and 46 are formed with radially extending channels 48 and 50 containing tubular elements 52 enclosing spring-actuated balls 54. In the positions of transmission said balls enter recesses 56 and 58 in the hood 14 and in the annular element 30, respectively. The conical portion 44 has also an annular channel 60 provided in the upper surface thereof, said channel containing balls 62 at four diametrically opposed points, which balls are adapted under the influence of springs 64 to press the channel upwardly to an extent limited by screws 66 secured to the portion 44. In the position of power transmission between said portion 44 and the hood 14 the balls 62 enter recesses 68 in the hood. The axial movement of the spindle 40 relative to the spindle 10 and the annular element 30 is supported by bearings 70 and 72, which are preferably of the self-lubricating type. The screw-tap 42 is entrained by the spindle 40 by means of an attachment 74, of known type and not shown in detail, receiving the square-head of the tap, and is held by a wedge-action produced by an annular member 76 actuated by a sleeve 78 adapted to be screwed on the spindle 40. The member 76 consists of a spiral wire the turns of which are bent so as to form a ring with rubber moulded between the individual turns of the spiral.

The thread cutting device operates in the following manner: The screw-tap 42 is located concentrically of and in contact with the roughly bored hole which is to be provided with threads. The spindle 10 and also the hood 14, are then pressed towards the work piece and are rotated. Due to the fact that the screw-tap abuts against the work piece, the spindle 40 carrying the member 38 will remain axially stationary while the conical portion 44 of the member 38 after a predetermined displacement of the hood 14 will enter the annular groove 36 of the hood and establish frictional connection between the spindle 40 and the hood 14 so as to cause the screw-tap to enter into thread cutting engagement with the bore of the hole. When the screw-tap has reached the end of the bore, the torsional moment increases sufficiently to cause the conical portion 44 to slide within the annular groove 36. Since the spring-actuated balls 62 and 54 will produce a rattling sound when passing the recesses 56 and 58, the operator carrying out the thread cutting operation will aurally establish that the latter is finished. He should then immediately move the spindle 10 with the hood 14 in a direction away from the threaded bore. In this operation the portion 44 of the member 38 is withdrawn from the annular groove 36, thus releasing the frictional engagement between said members. After a predetermined displacement of the hood 14, the outer conical portion of the member 38 will be brought into engagement with the similar conical inner wall of the annular element 30, frictional connection thus being established between said members.

During the entire operation above described the annular element 30 rotates in a direction opposite to that of the hood 14. This rotary movement is caused by the balls 22 mounted in the ball retainer 24 maintained rotationally stationary by means of an arm 80, the torsional moment of the hood being transmitted through said balls to the annular element 30. The balls 22 in the device constructed according to the invention thus have the same function as that of an intermediate gear wheel in a normal toothed gearing, so that the direction of rotation of the hood 14 and of the element 30 will be opposed. Further, a gear ratio is obtained which is in direct relation to the ratio between the circumferences of the roller races 18, 20 and 26, 28, respectively.

During the thread cutting operation the arm 80 preferably abuts against a rod arranged parallel to the working direction so as not to interfere with the axial displacement of the device. The circular arcs formed by the cross sections of the roller races 18, 20 and 26, 28 should always have a larger radius than that of the balls 22, so that even a slight axial pressure between the hood 14 and the element 30 will produce a wedge-action between the balls and the roller races thus ensuring perfect transmission of torque between the hood and the element. It should be mentioned that the radial cross sections of the roller races 18, 20 and 26, 28 may have some other profile than that of circular arcs, for instance a profile that follows straight lines or combinations of at least one straight line with a curved line.

In the embodiment shown the two conical portions 44 and 46 have a different taper. The taper of the portion 46 is considerably less than that of the portion 44 and as a result the risk of seizing between the screw-tap and the material of the bore is considerably less when the tap is being unscrewed out of the hole than when the thread is being cut. Inasmuch as the axial pressure required for performing the thread cutting operation can be kept very small, any seizing which might occur when the screw-tap is unscrewed will only cause the portion 46 to slide in the element 30. As the spring-actuated balls in said portion are adapted to enter the recesses 58 in the element 30, the operator will at once notice when such sliding occurs since the balls set up a rattling noise as soon as they pass over the recesses. It will then be possible for the operator immediately to stop the rotation of the spindle 40, for instance by stopping the spindle 10.

While one more or less specific embodiment of the invention has been shown, it is to be understood that this is for purpose of illustration only, and that the invention is not to be limited thereby, but its scope is to be determined by the appended claims.

What I claim is:

1. A reversible rotary tool holder comprising a driving member, a tool-holding driven member concentric with and axially shiftable between spaced end positions relative to the driving member, an annular retaining member located within the driving member, an annular force transmitting element located between said retaining member and said driven member, a plurality of balls carried by said retaining member and means for holding said retaining member rotationally stationary, said driving member and said force transmitting element having confronting grooves providing races and said balls being situated between said races for engagement with the same to locate said driving member and said force transmitting element relative to each other axially in both directions as well as radially, said driving and driven members having clutch surfaces located to engage when the driven member is axially in one of said end positions to provide a direct driving connection between said members, and said force transmitting element and said driven member having clutch surfaces located to engage when the driven member is axially in the other of said end positions and said retaining member is held against rotation to provide a reverse driving connection between said driving and driven members.

2. A reversible rotary tool holder comprising a driving member, a tool-holding driven member concentric with and axially shiftable between spaced end positions relative to the driving member, an annular retaining member located within the driving member, an annular force transmitting element located between said retaining member and said driven member, a plurality of balls carried by said retaining member and means for holding said retaining member rotationally stationary, said driving member and said force transmitting element having confronting grooves providing arcuate races having a greater radius than that of said balls and said balls being situated between said races for engagement with the same to locate said driving member and said force transmitting element relative to each other axially in both directions as well as radially, said driving and driven members having clutch surfaces located to engage when the driven member is axially in one of said end positions to provide a direct driving connection between said members, and said force transmitting element and said driven member having clutch surfaces located to engage when the driven member is axially in the other of said end positions and said retaining member is held against rotation to provide a reverse driving connection between said driving and driven members.

3. A reversible rotary tool holder comprising a driving member, a tool-holding driven member concentric with and axially shiftable between spaced end positions relative to the driving member, an annular retaining member located within the driving member, an annular force transmitting element located between said retaining member and said driven member, a plurality of balls carried by said retaining member and means for holding said retaining member rotationally stationary, said driving member and said force transmitting element having confronting grooves providing races and said balls being situated between said races for engagement with the same to locate said driving member and said force transmitting element relative to each other axially in both directions as well as radially, said driving and driven members having complementary friction surfaces located to engage when the driven member is axially in one of said end positions to provide a direct driving connection between said members, said force transmitting element and said driven member having complementary friction surfaces located to engage when the driven member is in the other of said end positions and said retaining member is held against rotation to provide a reverse driving connection between said driving and driven members, at least one of the sets of complementary friction surfaces being provided with a series of depressions and yieldably loaded detents projecting from the mating surface for engaging said depressions to increase the force transmitting capacity between the surfaces.

4. A reversible rotary tool holder comprising a driving member, a tool-holding driven member concentric with and axially shiftable between spaced end positions relative to the driving member, an annular retaining member located within the driving member, an annular force transmitting element located between said retaining member and said driven member, a plurality of balls carried by said retaining member and means for holding said retaining member rotationally stationary, said driving member and said force transmitting element having confronting grooves providing races and said balls being situated between said races for engagement with the same to locate said driving member and said force transmitting element relative to each other axially in both directions as well as radially, said driving and driven members having complementary friction surfaces provided by the sides of an annular wedge shaped groove in one of said members and the sides of a complementary annular flange on the other of said members, said surfaces being located to engage when the driven member is axially in one of said end positions to provide a direct driving connection between said members, and said force transmitting element and said driven member having complementary friction surfaces located to engage when the driven member is axially in the other of said end positions and said retaining member is held against rotation to provide a reverse driving connection between said driving and driven members.

5. A reversible rotary tool holder comprising a driving member, a tool-holding driven member concentric with and axially shiftable between spaced end positions relative to the driving member, an annular retaining member located within the driving member, an annular force transmitting element located between said retaining member and said driven member, a plurality of balls carried by said retaining member and means for holding said retaining member rotationally stationary, said driving member and said force transmitting element having confronting grooves providing races and said balls being situated between said races for engagement with the same to locate said driving member and said force transmitting element relative to each other axially in both directions as well as radially, said driving and driven members having complementary friction surfaces located to engage when the driven member is axially in one of said end positions to provide a direct driving connection between said members, and said force transmitting element and said driven member having complementary friction surfaces located to engage when the driven member is axially in the other of said end positions and said retaining member is held against rotation to provide a reverse driving connection between said driving and driven members, the aforesaid friction surfaces on the driven member comprising a first conical surface for engaging said driving member and a second and oppositely tapering conical surface for engaging said force transmitting element.

UNO ALLAN ALFREDEÉN.

REFERENCES CITED

The following references are of record in the file of this patent:

UNITED STATES PATENTS

| Number | Name | Date |
|---|---|---|
| 901,172 | Holgan | Oct. 13, 1908 |
| 1,359,422 | Percin | Nov. 16, 1920 |
| 1,909,366 | Koza | May 16, 1933 |

FOREIGN PATENTS

| Number | Country | Date |
|---|---|---|
| 197,280 | Great Britain | May 10, 1923 |
| 678,129 | France | Dec. 23, 1929 |